Dec. 6, 1960 C. F. BAKER ET AL 2,962,876
SEMI-AUTOMATIC ICE CUBE MAKER
Filed Jan. 7, 1959 6 Sheets-Sheet 1
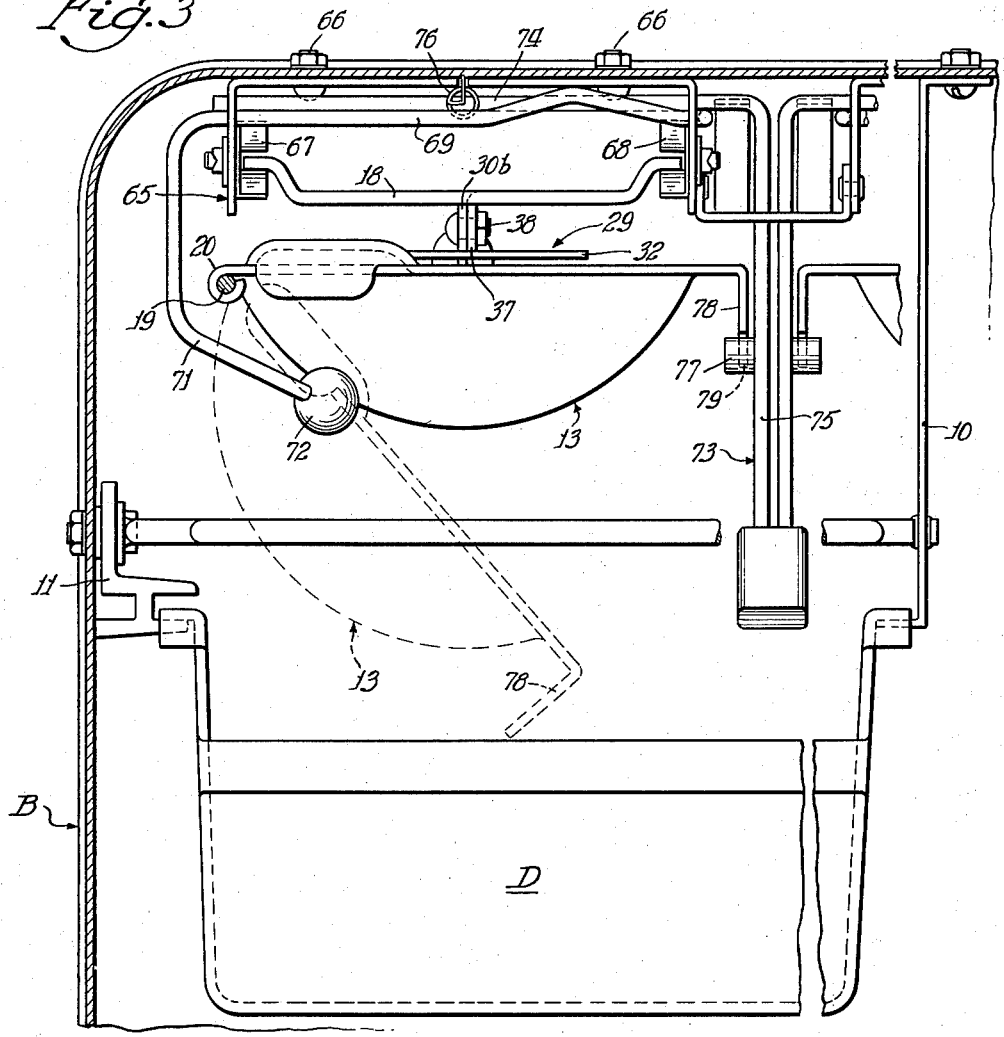
Fig. 3
Fig. 1
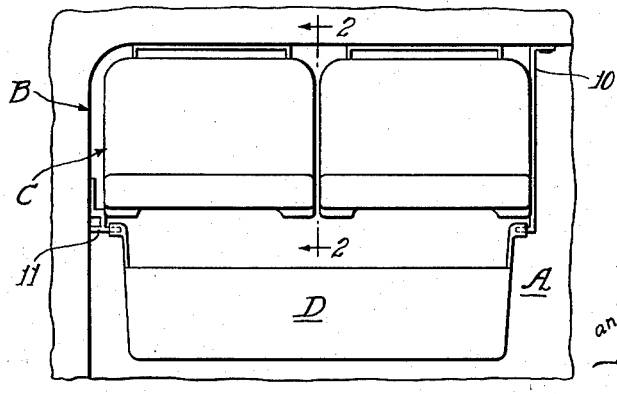
Inventors:
Clyde F. Baker
Romeo Bougie
and Florence B. Anderson
By: H. J. Schmid Atty.

Dec. 6, 1960

C. F. BAKER ET AL 2,962,876

SEMI-AUTOMATIC ICE CUBE MAKER

Filed Jan. 7, 1959

Inventors:
Clyde F. Baker
Romeo Bougie
and Florence B. Anderson
By H. J. Schmid Atty Dec. 6, 1960 C. F. BAKER ET AL 2,962,876
SEMI-AUTOMATIC ICE CUBE MAKER
Filed Jan. 7, 1959 6 Sheets-Sheet 3
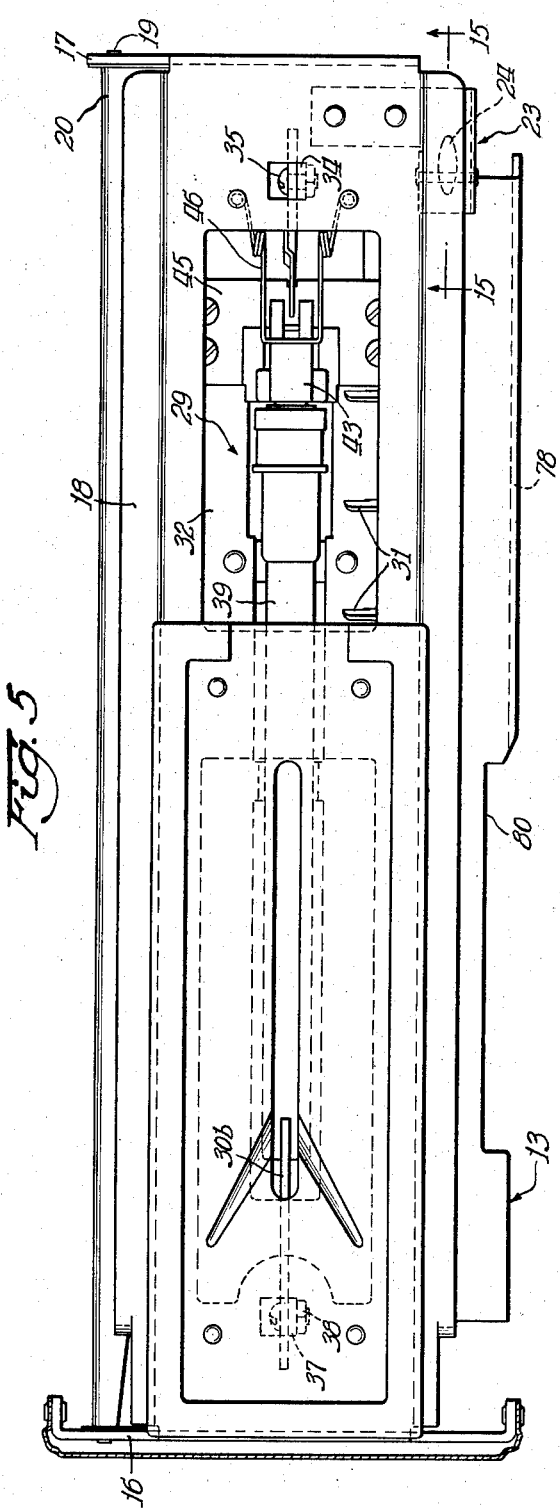
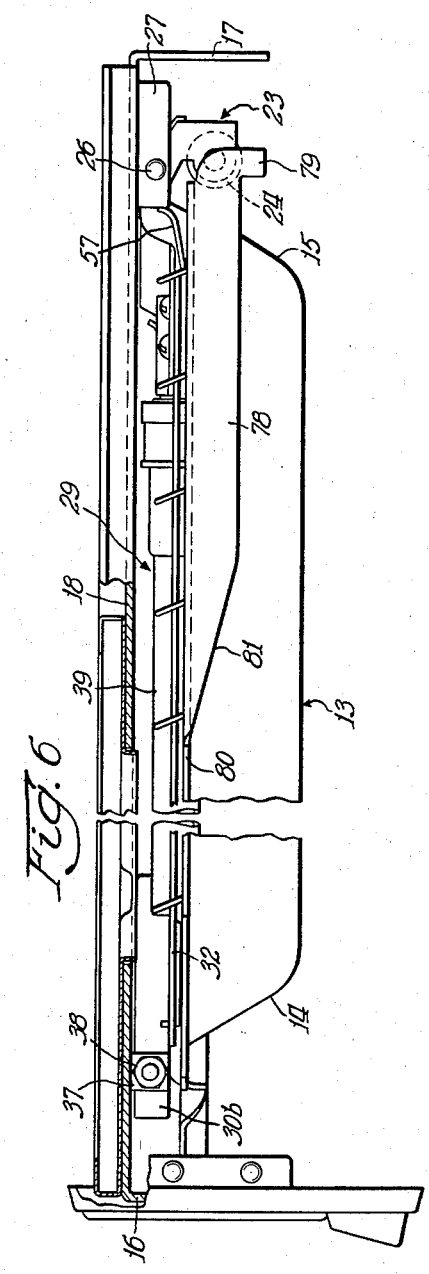
Inventors:
Clyde F. Baker
Romeo Bougie
and Florence B. Anderson
By: H. J. Schmid Atty.

Dec. 6, 1960  C. F. BAKER ET AL  2,962,876
SEMI-AUTOMATIC ICE CUBE MAKER
Filed Jan. 7, 1959  6 Sheets-Sheet 4
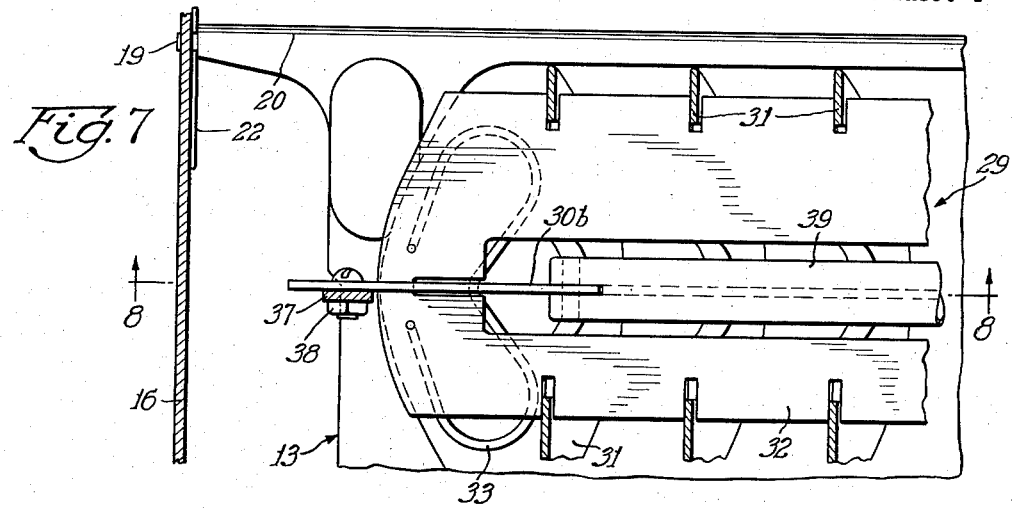
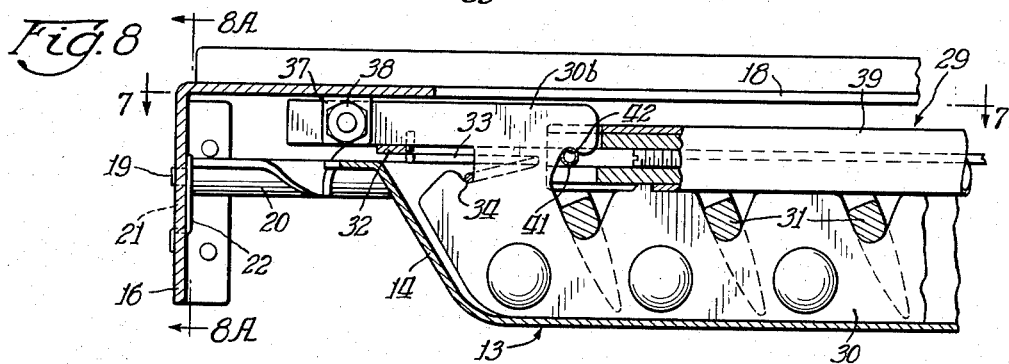
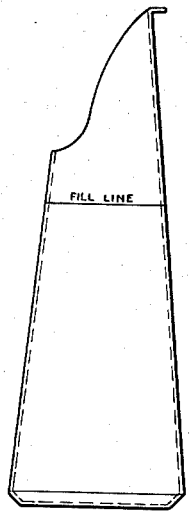
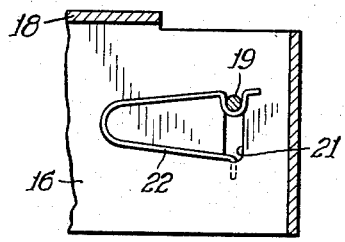
Inventors:
Clyde F. Baker
Romeo Bougie
and Florence B. Anderson
By: H. J. Schmid Atty.

Dec. 6, 1960                C. F. BAKER ET AL                 2,962,876
                     SEMI-AUTOMATIC ICE CUBE MAKER
Filed Jan. 7, 1959                                    6 Sheets-Sheet 5
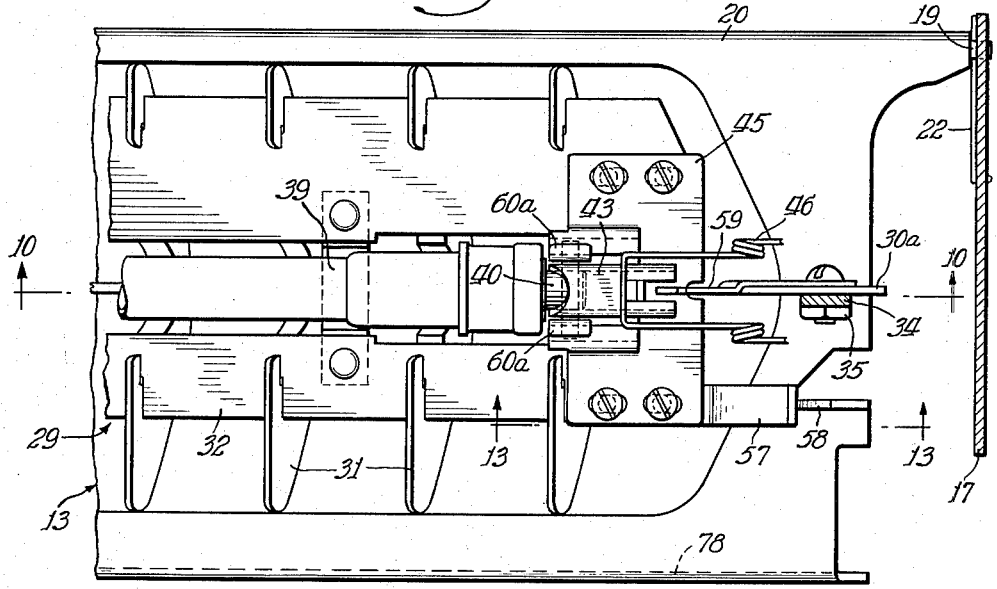
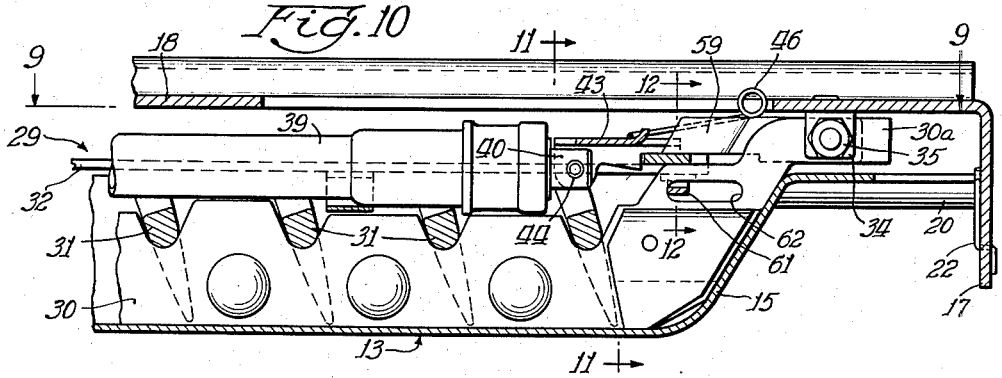
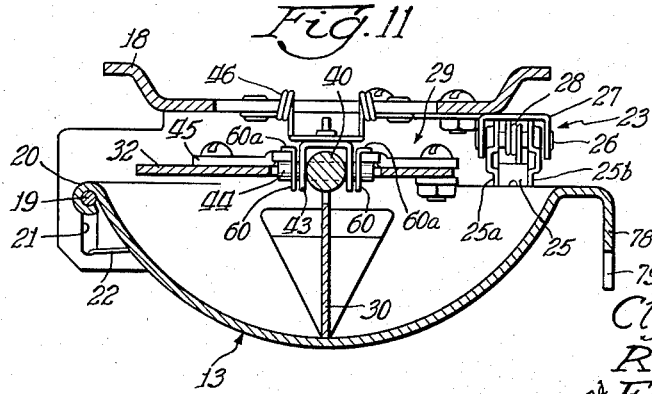
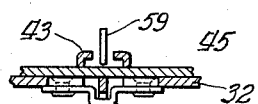
Inventors:
Clyde F. Baker
Romeo Bougie
and Florence B. Anderson
By H. J. Schmid Atty.

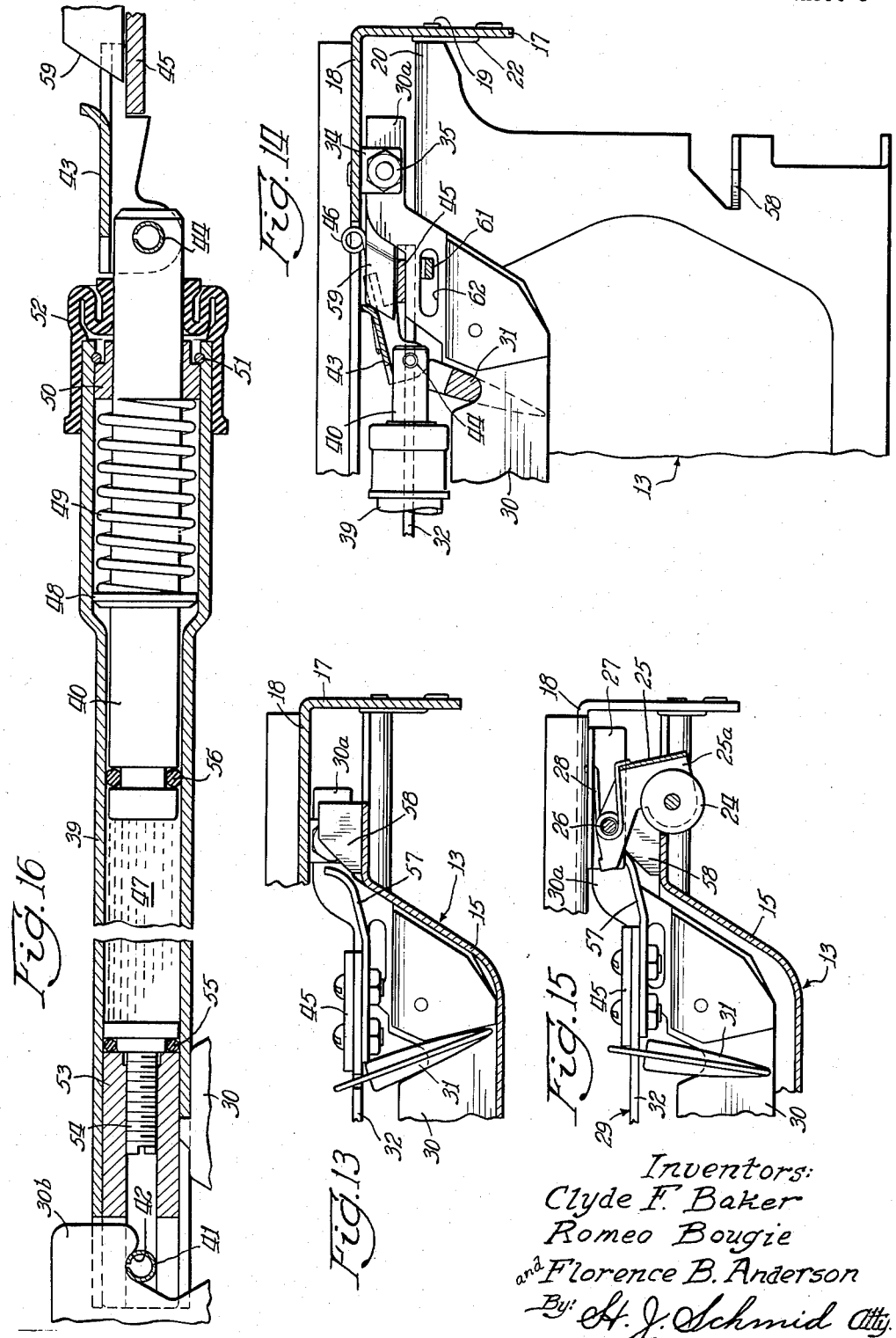

United States Patent Office 2,962,876
Patented Dec. 6, 1960

2,962,876

SEMI-AUTOMATIC ICE CUBE MAKER

Clyde F. Baker and Romeo Bougie, Muskegon Heights, Mich., and Florence B. Anderson, Winnetka, Ill.; said Baker and said Bougie assignors to Borg-Warner Corporation, Chicago, Ill., a corporation of Illinois Filed Jan. 7, 1959, Ser. No. 785,365

24 Claims. (Cl. 62—301)

This invention relates to refrigeration apparatus and more particularly to ice block harvesting apparatus designed for household refrigerators.

An object of the invention is to provide an improved ice block harvesting apparatus for household refrigerators.

Another object of the invention is to provide an improved ice block harvesting apparatus having a movable tray; a grid structure in the tray and composed of relatively movable plates for dividing frozen material in the tray into ice blocks; and means automatically operative to relatively move the plates to free the ice blocks from the tray and grid structure and also to move the tray relative to the grid structure to a position for ejecting the ice blocks from the tray.

Another object of the invention is to provide an improved ice block harvesting apparatus wherein a tray is mounted for pivotal movement, a stationary grid structure is disposed in the tray and comprises relatively movable plates dividing frozen material in the tray into ice blocks; and power means, connected to the plates of the grid structure and associated with the tray, is automatically operable, after ice block formation, to relatively move the plates to free the ice blocks from the tray and grid structure and to release the tray from the grid structure for pivotal movement of the tray to a position ejecting the ice blocks from the tray.

Another object of the invention is to provide an improved ice block harvesting apparatus including a stationarily mounted, unitary movable, walled grid structure received within a pivotably mounted tray, and a power unit in the form of an ice motor actuatable, after ice block formation in the tray, to relatively move the walls of the grid structure to break the bond between and separate the ice blocks adhering to the walls of the grid structure and to the tray, and to then release the tray for pivotal swinging movement thereof to deposit the blocks in a storage receptacle.

Other objects and advantages of the invention will become apparent from the following description taken in connection with the drawings in which:

Fig. 1 is a front elevational view illustrating a freezing compartment of a refrigerator housing the ice block harvesting apparatus embodying the invention;

Fig. 3 is a front sectional view of the apparatus shown in Fig. 2 said section being taken on line 3—3 of Fig. 2.

Fig. 5 is a top elevational view of the grid structure, tray, and ice motor of the apparatus;

Fig. 6 is a side elevational view of the grid structure, tray, and ice motor of the apparatus;

Fig. 7 is a top plan view of the front portion of the grid structure, tray, and ice motor shown in Fig. 6;

Fig. 8 is a sectional view taken on line 8—8 of Fig. 7;

Fig. 8A is a fragmentary sectional view taken on line 8A—8A of Fig. 8;

Fig. 9 is a top elevational view of the rear portion of the grid structure, tray and ice motor shown in Fig. 6, taken on line 9—9 of Fig. 10;

Fig. 10 is a sectional view of the rear portion of the grid structure, tray, and ice motor shown in Fig. 6, said section being taken on line 10—10 of Fig. 9;

Fig. 11 is a sectional view taken on line 11—11 of Fig. 10;

Fig. 12 is a fragmentary sectional view taken on line 12—12 of Fig. 10;

Fig. 13 is a fragmentary sectional view taken on line 13—13 of Fig. 9;

Fig. 14 is a view similar to Fig. 13 but illustrating the grid structures plates moved by the ice motor to free the ice-blocks from the plates;

Fig. 15 is a view similar to Fig. 14 illustrating the grid structure raised from the tray by the ice motor and preparatory to release the tray for pivotal movement to eject the ice blocks from the tray;

Fig. 16 is a sectional view of the ice motor;

Fig. 17 is a side view of a water receptacle used for filling the tray.

Figure 2:
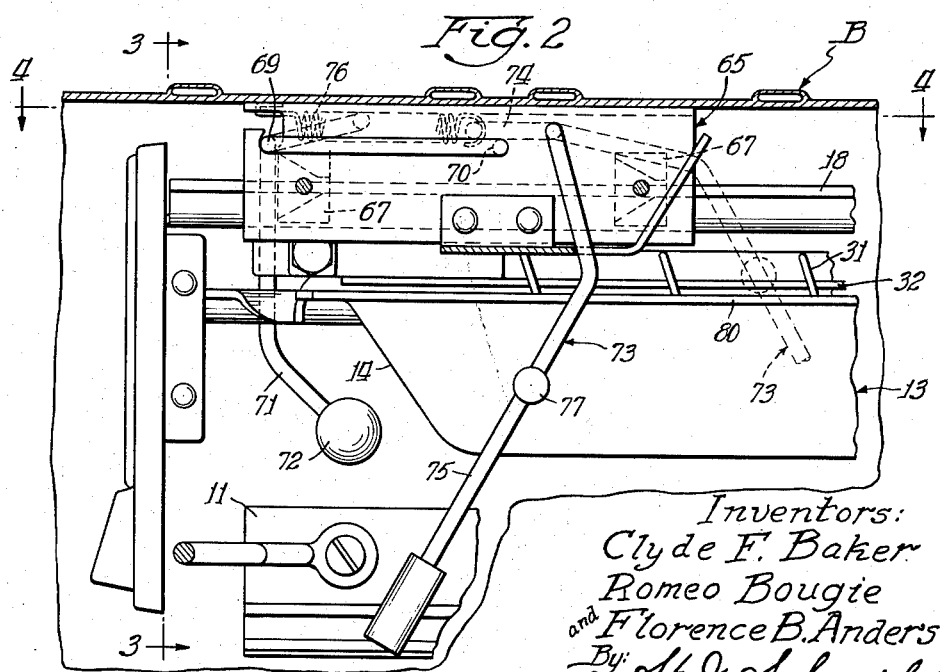
Fig. 2 is an enlarged side elevational view of a fragmentary portion of the ice block harvesting apparatus, taken on line 2—2 of Fig. 1.

Referring to Figs. 1 and 2, there is shown a portion of a conventional domestic refrigerator having a freezing compartment A provided by an evaporator B. Located in the upper left hand corner of the freezing compartment is the ice block-making and harvesting apparatus C embodying the principle of the present invention. An ice block storage basket D is positioned beneath the apparatus and receives and retains the ice blocks produced by the apparatus. The basket D is slidably supported within the compartment A by a vertical plate 10 and track 11. More particularly, the plate 10 has a flanged upper end secured to the top wall of the refrigerator by nut and bolt assemblies as shown, and the lower flanged end is received within a groove formed in the upper end of the basket side wall. The track 11 extends along and is secured to the side wall of the refrigerator by nut and bolt assemblies and is provided with a laterally extending portion received within a groove in the top edge of the adjacent side wall of the basket D. It will be apparent that the basket D is thus slidably supported beneath the ice block-making and harvesting apparatus and can be readily removed and replaced in a refrigerator when desired.

The ice block-making and harvesting apparatus comprises an ice block tray or pan 13 formed of aluminum or other suitable material and having a substantially semi-cylindrical or arcuate cross section with sloping end walls 14, 15, as shown in Figs. 6, 8, 10, and 13. The tray is disposed between and is pivotally connected to the downwardly extending end walls 16 and 17 of a plate 18 by a hinge assembly provided by a pin 19 positioned within a rolled over top edge 20 of the tray and having its ends received within vertical slots 21 in the plate end walls and normally maintained in engagement with the upper ends of the slots by hairpin springs 22 compressed between the lower ends of the slots and the pin ends. This arrangement permits the pin 19, and thereby the tray 13, to move vertically to prevent distortion of the pin or tray during pivotal movement of the tray between a horizontal ice block-making position and a substantially vertical ice block-ejecting position, as shown in Fig. 3.

The tray is normally maintained in its horizontal position by means releasably holding the tray in its ice blockmaking position and provided by a latch or detent 23 (Figs. 5, 6, 11 and 15) pivotally connected to and depending from the plate 18 adjacent its end wall 17 and includes a wheel 24 normally engaging the bottom of the upper edge of the tray, the wheel being rotatably mounted between and on the spaced ears 25a and 25b of a latch member having its upper ends extending between and pivotally connected by a pin 26 to spaced portions of a bracket 27 secured to the plate 18. The latch member 25 is provided with a torsion spring 28 surrounding the pin 26 and having its opposite ends bearing against the latch member and plate 18, as shown, to constantly urge the wheel toward and into a position beneath the upper edge of the tray to releasably hold the tray in its horizontal position.

Disposed within the tray 13 is a grid structure indicated generally by the reference numeral 29 and designed to subdivide the tray into a plurality of small divisions in which fluid, such as water, may be frozen to provide solid cubes or blocks of ice. The grid structure 29 comprises a vertical plate 30 extending along the full length of the tray interior and disposed substantially equally from the side edges of the tray. A plurality of vertical divider plates 31 are disposed generally normal to the vertical plate 30 and loosely interlock and relatively movable to each other and the plate 30. The divider plates 31 are movable from a slanted position to a substantially vertical position substantially normal to the bottom of the tray after operation of power means in the form of hydraulically operated piston and cylinder arrangement which may be referred to as an ice motor. As seen in Figs. 9, 10, 13, 14 and 15, each divider plate 31 is loosely interlocked with a horizontal plate 32. The tray 13 and the transverse plates 31 are substantially semi-circular in shape. The horizontal plate 32 is longitudinally movable to be effective to pivotally move the transverse plates 31 relative to the plate 30 from the position shown in Figs. 8, 10, 13 to the position shown in Figs. 14 and 15 to loosen the ice cubes from the grid structure and the tray. For this purpose, the plate 32 has a plurality of slots at its edges for receiving the upper portions the transverse plates 31, the horizontal plate 32 overlaying the grid structure and loosely interlocking the divider plates 31 thereof by the engagement of the slots therewith to maintain the divider plates 31 and the vertical plate 30 in the ice block-making positions as shown in Figs. 7, 8, 9, 10, and 11, and referring specifically to Figs. 7 and 8, a spring 33 of bowed configuration has its opposite ends extending within and being confined in openings at one end of the drive plate 32 with a centrally located arcuate portion received within a notch 34 (Fig. 8) at the adjacent upwardly extending end of the vertical plate 30, the spring 33 reacting between the drive plate 32 and the vertical plate 30 to cause the divider plates and the vertical plate to normally assume the position shown in Figs. 7-11. For this purpose, the vertical plate 30 is fixed at its opposite upwardly projecting end 30a to a lug 34 connected to and securely held in position by a nut and bolt assembly 35 extending through aligned openings in the end of the drive plate and lug 34 stuck downwardly from plate 18 to prevent longitudinal movement of the plate 30. As seen in Figs. 2, 5-8, the plate 30 has an upwardly extending portion 30b engaging a lug 37 extending down from the plate 18 and secured thereto by a nut and bolt assembly 38. As will be seen from inspection of Figs. 10, 11, 13, 14 and 15, the vertical plate 30 is provided with a series of notches of the V-shape to permit the ready movement of the divider plates from the ice block-forming positions (Figs. 9-13) to their ice block-loosening positions (Figs. 14 and 15). Accordingly, the divider plates 31 are normally inclined to the vertical and bear loosely upon the vertical plate 30.

To effect operation of the divider plates 31, after the ice cubes are molded and in condition to be freed from the grid structure, there is provided power means in the form of the hydraulic cylinder 39 and the piston 40 relatively movable upon the freezing of the liquid confined within the cylinder, and actuating the piston to move the driving plate 32, and thereby the divider plates 31 to loosen the ice cubes. The ice motor or hydraulic means comprises a cylinder 39 having a piston 40, the cylinder having a liquid confined therein capable of freezing and which may be water, or a mixture of water and sodium nitrate or water and sodium-metasilicate which has a freezing point below the freezing point of water. Upon freezing the fluid contained within the cylinder, sufficient expansion will occur to drive the piston and thereby the drive plate 32 to move the divider plates 31 to loosen the ice cubes in the tray, the divider plates rotating for this purpose from the position of Figs. 7-10 and to the positions shown in Figs. 15 and 16. More particularly and referring to Figs. 7 and 8, the cylinder has one end provided with a slot receiving the extension 30b at one end of the drive plate, the cylinder end having a pin 41 therethrough positioned within a notch 42 in the plate. The exposed end of the piston is pivotally connected to a saddle or yoke 43 by a pin 44; the saddle having spaced depending portions bearing against the end of a slot in a U-shaped piece 45 fixed to and securely connected to the drive plate 32 to effect movement of the drive plate upon outward movement of the piston to cause the divider plates 31 to rotate and loosen the ice cubes in the tray. The centrally disposed portion of the yoke 43 overlies and engages the piece 45 and the ends of the pin 44 underlie and engage the bottom surface of the piece 45 to guidingly position the piston during movement thereof. To maintain the saddle in effective driving engagement between the piston and the drive plate, a rat-trap spring 46 is securely fastened to the plate 18 and bears against the saddle to firmly hold it in position to insure a driving connection between the piston and the drive plate. As can be seen from inspection of Figs. 9 and 11, the piston and cylinder arrangement lie and are disposed within an elongate slot in the drive plate 32. Accordingly, as one end of the cylinder is securely fastened to the plate 18 and is thus maintained stationary, the outward movement of the piston will be effective to cause the drive plate 32 to be moved in a direction causing the divider plates to be disposed in a vertical position.

Referring to Fig. 16, the ice motor comprises the piston 40 and cylinder 39, the cylinder having a fluid chamber 47 with an enlarged end portion receiving an annular abutment portion 48 of the piston engaging one end of a spring 49, the opposite end of the spring being seated against a collar 50 held in the end of the cylinder by a snap ring 51 seated in a groove in the cylinder and engaging the collar. A flexible shield 52 surrounds and engages the piston end and the end of the cylinder. A hollow interiorly threaded plug 53 is pressfitted within the cylinder and receives a screw 54, a rubber O ring 55 being compressed between the head of the screw, the cylinder, and plug to provide a fluid-tight seal. Also, a rubber O ring 56 is confined between the cylinder and piston for providing a fluid tight seal.

A feature of the present invention resides in the operation of the ice motor being effective to automatically cause the tray to move pivotally about and into a position wherein the loosened ice blocks in the tray are ejected into the basket D. For this purpose and referring to Figs. 6, 13 and 15, the drive plate 32 has secured thereto an arcuate leaf or arm member 57 engageable with a cam member 58 secured to the rear end of the tray so that upon rearward movement of the drive plate, upon actuation of the piston to loosen the ice blocks, the leaf arm will contact the cam member to force the tray in a downward direction to rotate the latch member 25 to disengage the wheel 24 from the tray so that the weight of the tray and the loosened ice cubes in the tray will cause the tray to drop by pivotal movement about the pin 19 to eject the ice cubes into the basket. This operation is shown in Fig. 15 wherein the cam arrangement is urging the tray down to its released position.

Another important feature of the present invention resides in mechanism adapted to insure release of the ice cubes from the grid plates when the ice cube tray 13 is dropped. It will be observed in Figs. 10, 11, 14, and 15, that the yoke 43 is pivoted and raised about the end of the piston by a cam portion 59 on the plate 18; the pin 44 connecting the piston to washers 60, 60 having portions 60a, 60a (Fig. 11) engaging edge portions of the piece 45 to urge the drive plate 32 rearwardly upon movement of the piston to ice block-loosening positions. As seen in Figs. 10 and 14, the plate 32 has a portion 61 received within a slot 62 in the plate 30 to guide the plate 32 during relative movement of the plate 30 and the plate 32. As previously described, the spring 33 is located on the horizontal plate 32 and serves to control the position of the plates 32 and 31 and functions to move and maintain these plates 32 and 31 to the ice cube-making positions. When the ice motor operates by freezing and expansion of the solution therein to move the piston outwardly of the cylinder, the yoke 43 acts as a trigger by riding up the cam 59 and, as the solution becomes frozen, the yoke will be disengaged from the piece 45. When this disengagement occurs, the spring 33 quickly moves to return the plates 30 and 31 with a snap action to their ice cube-making positions and, by so doing, jars or shakes loose any ice cubes which may have adhered to these plates so that all of the cubes are released and separated from the plates to drop into the storage basket D when the tray pivots downwardly.

Figure 4:
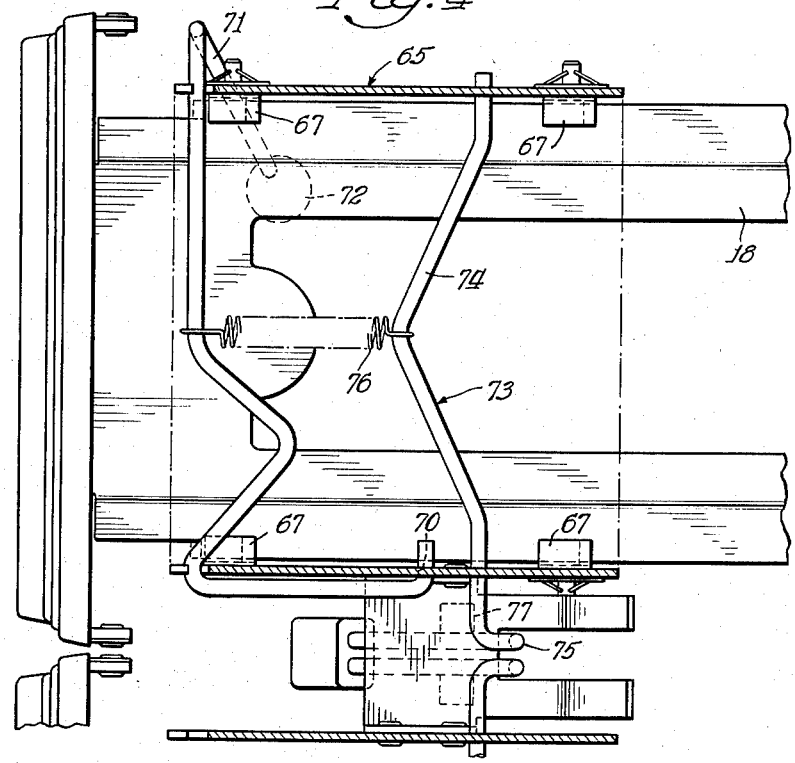
Fig. 4 is a top sectional view of the apparatus shown in Fig. 2, said section being taken on line 4—4 of Fig. 2.

The ice cube tray 13, grid assembly 29, ice motor, and plate 18 form a unitary assembly, as seen in Figs. 5–11, which can be inserted into and removed from the freezing compartment, or if desired may be moved outwardly of and held in position by its supporting structure secured to the freezing compartment for the purpose of filling the tray with water for ice cubes. For this purpose, this unitary assembly is positioned upon a bracket arrangement (Figs. 2, 3, and 4) secured to the top wall of the refrigerator, this bracket assembly comprising a U-shaped member 65 secured by nut and bolt assemblies 66 to the top wall of the refrigerator and with the opposed side walls of this bracket being provided with spaced slides or guides 67, 68 having grooves within which are received the opposite side edges of the plate 18 permitting movement of the tray, grid structure, the ice motor, and the plate 18 as a unitary assembly along the guides of the bracket. This bracket is positioned at the front of the top wall of the refrigerator so that this described unitary assembly may be moved outwardly of the freezing compartment of the refrigerator for the addition of ice water in the tray for a subsequent freezing operation into ice cubes and operation of the ice motor to loosen the ice cubes and drop the tray for ejecting the ice cubes into the basket D.

A further feature of the invention is that the tray is automatically lifted to its raised ice making position by the withdrawal movement of the unitary assembly along the bracket and outwardly of the freezing compartment. Means for accomplishing this function is provided in the form of a lift arm assembly fixed to the bracket member 65 and comprising a rod 69 extending between and through the spaced side walls of the member 65, one end of the rod being angularly bent to lie along one side wall and into an opening 70 in the side wall. The rod 69 also has an arm 71 extending downwardly of the bracket and having the lower end thereof provided with a nylon ball 72 effective to engage the curved end surface and then the bottom curved surface of the ice tray to raise the ice tray upwardly and into a position causing the latch mechanism to become engaged with the ice tray in its normal horizontal ice cube-making position. It will be seen from inspection of Figs. 2, 3, and 4, that outward movement of the unitary assembly causes the ball 70 to engage these curved surfaces of the ice tray to raise the ice tray and into a position where the latch will become effective to releasably hold and maintain the ice tray in its raised position for a subsequent ice making and harvesting operation.

Assuming that the ice tray is in its substantially vertical position as shown in dotted lines in Fig. 2, after ejection of the ice cubes from the tray, movement of the unitary assembly in a direction outwardly of the freezing compartment causes the ball to engage the tray and raise it to its horizontal position. As the unitary assembly is disposed outwardly of the freezing compartment, it is in a position to permit the filling of the ice tray with water by the housewife. Accordingly, by use of a dispenser or receptacle, such as shown in Fig. 17, and having water therein to the "Fill Line," the housewife pours the water into the openings in the top of the plate 18 and onto the ice motor where it will flow into the ice tray. As the water is of a temperature conducive to liquify the frozen liquid in the ice motor, the spring 49 will move the piston inwardly of the cylinder of the ice motor, the spring 33 having previously moved the plates 30 and 31 to their inclined ice cube-making positions. Upon movement of the unitary assembly into the freezing compartment, the water in the tray will freeze and subsequently the liquid in the ice motor will freeze and be operated to cause the drive plate 32 to move the plates 30 and 31 to positions wherein the ice cubes will be loosened from the plates and the tray, the snap action effected by the spring 33 due to the trigger action of the yoke 43 and the cam 59 causing return of the plates to ice cube-making positions insuring release of the cubes, with subsequent operation of the cam mechanism of the tray and drive plate to cause the tray to be moved downwardly about its pivotal or hinge connection to the plate 18 to effect release of the latch and dropping of the tray to eject the ice cubes.

Another important feature of the invention is the provision of means for preventing withdrawal of the described unitary assembly from the support or bracket 65 fixed to the top wall of the refrigerator, such means comprises an assembly 73 including a lever arm having a pivoting portion 74 mounted in the side walls of the bracket 65 secured to refrigerator top wall, and a lever portion 75 depending downwardly and along one side of the unitary assembly. More particularly, the pivotal connection provided for the lever is in the form of a wire extending between and through aligned openings in the spaced walls of the bracket with the portion 74, intermediate the spaced walls, being formed V-shaped with a coil spring 76 having one end attached to the apex of the V-shaped portion and the other end of the spring being connected to the bracket as shown particularly in Figs. 3 and 4. The depending arm of the lever is provided with a laterally projecting button or boss 77 which in the normal position of the lever is disposed beneath a downwardly turned flange 78 (Fig. 3, 4, and 6) at the side edge of the tray and which is provided with a depending end tab 79 disposed in a common horizontal plane with the boss 77 and operative to engage the boss to prevent the withdrawal of the described unitary assembly from the bracket in the freezing compartment. Should it be desired to remove the unitary assembly from the bracket, the lever is pushed backward and will move upward in a clockwise direction as viewed in Fig. 2 to a position where the boss can pass through a notch 80 in the edge of the tray and be held in this position to avoid engagement of the boss with the top portion of the tray while the unitary assembly is pulled forwardly and out of the refrigerator compartment.

Should the tray be in its downward ice cube-ejecting position as shown in dotted lines in Fig. 3 and in full lines in Fig. 14, the tray may be moved outwardly of the freezing compartment and the lift arm 71 with its ball 72 will be effective to raise the tray back into a position to engage the latch 25 with the end of the tray to position the tray in its ice cube-making position. To avoid any possibility of the boss 77 on the lever 73 engaging and obstructing movement of the tray by action of the spring 76 holding the lever arm 75 in its downward position during this outward movement of the unitary assembly, the downwardly turned flange 78 on the tray is provided with a sloping cam surface 81 (Fig. 6) adapted to engage the boss 77 and to cam its lever along this surface and into a position to engage the boss 77 with the stop 79 on the tray.

It is believed that various arrangements and modifications of the present invention may be undertaken without departing from the spirit and scope of the appended claims.

What is claimed is:

1. In an ice making machine, a tray structure; a grid structure received within said tray structure and including relatively movable plates for dividing frozen material within said tray structure into blocks; means supporting said grid structure and pivotally supporting said tray structure for movement downwardly from a grid structure-receiving position to separate said tray structure from said grid structure; means for releasably holding said tray structure in grid structure-receiving position; and means connected to one of said structures and operative on said grid structure to move the plates relative to one another to first loosen the blocks while said grid structure is received within the tray structure and to then operate said holding means to release said tray structure from said grid structure for pivotal movement of said tray structure downwardly to remove the blocks therefrom.

2. In an ice making machine, a tray; a grid disposed within said tray including relatively movable plates for dividing frozen material within the tray into blocks; means for supporting the tray for pivotal movement downwardly of said grid for separating the grid from the tray; means for releasably holding said tray in engagement with said grid; and power means associated with the grid and tray and effective to move the plates relative to one another to loosen the blocks while said grid is disposed in the tray and to then operate said holding means to release said tray from said grid for pivotal movement of said tray downwardly to remove the blocks therefrom.

3. In an ice making machine, a tray; a grid disposed within said tray including relatively movable plates for dividing frozen material within the tray into blocks; means for supporting the tray for pivotal movement downwardly of said grid for separating the grid from the tray; means for releasably holding said tray in engagement with said grid; and power means carried by said grid and effective to first move the plates relative to one another to loosen the blocks while said grid is disposed in the tray and to then move said tray about said pivot to actuate said holding means to release said tray from said grid for pivotal movement of said tray downwardly by gravity to remove the blocks therefrom.

4. In an ice making machine, a tray; a grid disposed within said tray including relatively movable plates for dividing frozen material within the tray into blocks; means for supporting the tray for pivotal movement downwardly of said grid for separating the grid from the tray; means for releasably holding said tray in engagement with said grid; and an ice motor carried by said grid and effective to move the plates relative to one another to loosen the blocks while said grid is disposed in the tray and to move said tray about said pivot to actuate said holding means to release said tray from said grid for pivotal movement of said tray downwardly by gravity to remove the blocks therefrom.

5. In an ice making machine, a tray; a grid disposed within said tray including relatively movable plates for dividing frozen material within the tray into blocks; means for mounting the tray for pivotal movement from and to a horizontal position; means for releasably holding said tray in its horizontal position; and power means carried by and connected to said grid and operable to move the plates thereof relative to one another to loosen the blocks while said grid is disposed in the tray in its horizontal position and then to exert force on said tray to move said tray to operate said holding means to release said tray from said grid for pivotal movement of said tray from its horizontal position downwardly to remove the blocks therefrom.

6. In an ice making machine, a tray; a grid received within said tray including relatively movable plates for dividing frozen material within the tray into blocks; a support for said grid; means on said support and mounting said tray for pivotal movement downwardly of said grid for separating the grid from the tray; means carried by said support and engaging said tray for releasably holding said tray in grid-receiving position; and power means associated with the grid and tray and effective to move the plates relative to one another to loosen the blocks while said grid is disposed in the tray and to move said tray to operate said holding means and thereby release said tray from said grid for pivotal movement of said tray downwardly to remove the blocks therefrom.

7. In an ice making machine, a tray; a grid received within said tray including relatively movable plates for dividing frozen material within the tray into blocks; a support for said tray; means on said support and mounting said tray for pivotal movement downwardly of said grid for separating the tray from the grid; means for releasably holding said tray in a grid-receiving position; cam means on said tray and operative to move said holding means to release said tray for pivotal downward movement of said tray; and power means associated with the grid and tray effective to move the plates relative to one another to loosen the blocks while said grid is disposed in the tray and co-operating with said cam means to operate said holding means to release said tray from said grid for pivotal movement of said tray downwardly to remove the blocks therefrom.

8. In an ice making machine, a tray; a grid disposed within said tray including relatively movable plates for dividing frozen material within the tray into blocks; means for supporting said tray and for pivotal movement for separating the grid from the tray; a spring-actuated detent on said supporting means and engaging said tray for releasably holding said tray in engagement with said grid; cam means on said grid and tray; and power means connected to said grid and effective to move the plates relative to one another to loosen the blocks while said grid is disposed in the tray and to operate said cam means to actuate said detent and thereby release said tray from said grid for pivotal movement of said tray downwardly to remove the blocks therefrom.

9. In an ice making machine, a tray; a grid received within said tray including relatively movable plates for dividing frozen material within the tray into blocks; a support having means for mounting said grid structure and tray for horizontal sliding movement as a unit; means pivotally mounting said tray for downward movement to a substantially vertical position to separate the tray from the grid; means on said mounting means and tray for holding said tray in a horizontal position and releasable to effect pivotal downward movement of said tray; means associated with said grid and tray and effective to move said plates relative to one another to loosen the blocks while said grid is disposed in the tray and to operate said holding means to release said tray from said grid for pivotal movement of said tray to a downward position to remove the blocks therefrom; and means on said support and operative during unitary sliding movement of said grid and tray to pivotally move said tray from its downward position to its horizontal position and to effect operation of said holding means to engage and hold said tray in a grid-receiving horizontal position.

10. In an ice making machine, a tray; a grid disposed within said tray including relatively movable plates for dividing frozen material within the tray into blocks; a support having means for mounting said grid structure and tray for horizontal sliding movement as a unit; means pivotally mounting on said support said tray for downward movement to a substantially vertical position to separate the tray from the grid; means on said mounting means and tray for holding said tray in a horizontal position and releasable to effect pivotal downward movement of said tray; means associated with said grid and tray and effective to move said plates relative to one another to loosen the blocks while said grid is disposed in the tray and to operate said holding means to release said tray from said grid for pivotal movement of said tray to a downward position to remove the blocks therefrom; and a lift arm fixed said support and operative during unitary sliding movement of said grid and tray to engage the bottom of said tray and to pivotally move said tray from its downward position to its horizontal position and to effect operation of said holding means to engage and hold said tray in a grid-receiving horizontal position.

11. In an ice making machine, a tray; a grid received within said tray including relatively movable plates for dividing frozen material within the tray into blocks; a support having means for mounting said grid structure and tray for horizontal sliding movement as a unit; means connecting said grid and tray for pivotally mounting said tray for downward movement for separating the tray from the grid; means on said mounting means and tray for holding said tray in a horizontal position and releasable to effect pivotal movement of said tray; means associated with said grid and tray and effective to move said plates relative to one another to loosen the blocks while said grid is disposed in the tray and to operate said holding means to release said tray from said grid for pivotal movement of said tray to a downward position to remove the blocks therefrom; means on said support and operative during said sliding movement of said grid and tray to pivotally move said tray from its downward position to its horizontal position and to effect operation of said holding means to engage and hold said tray in a grid-receiving horizontal position; and means on said support and normally cooperating with said tray to limit said sliding movement of said tray and grid, and movable to permit disengagement and removal of said grid and tray from said support.

12. In an ice making machine, a tray; a grid received within said tray including relatively movable plates for dividing frozen material within the tray into blocks; a support having means for mounting said grid and tray for horizontal sliding movement as a unit means pivotally connecting said tray to said grid for movement of said tray downwardly for separating the grid from the tray; latch means on said mounting means for holding said tray in a horizontal position and releasable to effect pivotal downward movement of said tray; cam means connected to said grid and tray and operable to move said tray to release said latch means to effect downward movement of said tray; power means associated with said grid and tray and effective to first move said plates relative to one another to loosen the blocks while said grid is disposed in the tray and then actuate said cam means and thereby said latch means to release said tray from said grid for pivotal movement of said tray to a downward position to remove the blocks therefrom; and means on said support and operative to pivotally move said tray from its downward position to its horizontal position and to effect operation of said holding means to engage and maintain said tray in a grid-receiving horizontal position.

13. In an ice making machine, a tray; a grid structure received within said tray including relatively movable plates providing a drive plate loosely interlocking a plurality of divider plates for dividing frozen material within the tray into blocks; a support having means for mounting said grid structure and tray for horizontal sliding movement as a unit; means connecting said tray to said grid structure and for pivotal movement of said tray downwardly for separating the grid structure from the tray; latch means on said mounting means for holding said tray in a horizontal position and releasable to effect pivotal downward movement of said tray; power means carried by and connected to said drive plate and being operable to move the divider plates by operation of said drive plate to free the blocks from the grid structure and tray while said grid structure is disposed in the tray and to operate said holding means to release said tray from said grid for pivotal movement of said tray to a downward position to remove the blocks therefrom.

14. In an ice making machine, a tray; a grid structure received within said tray including relatively movable plates providing a drive plate loosely interlocking a plurality of divider plates for dividing frozen material within the tray into blocks; a support having means for mounting said grid structure and tray for horizontal sliding movement as a unit; means connecting said tray to said grid structure and for pivotal movement of said tray downwardly for separating the grid structure from the tray; latch means on said mounting means for holding said tray in a horizontal position and releasable to effect pivotal downward movement of said tray; power means carried by and connected to said drive plate and being operable to move the divider plates by operation of said drive plate to free the blocks from the grid structure and tray while said grid structure is disposed in the tray and to operate said holding means to release said tray from said grid for pivotal movement of said tray to a downward position to remove the blocks therefrom; means on said support and operative to pivotally move said tray from its downward position to its horizontal position and to effect operation of said holding means to engage and maintain said tray in a grid-receiving horizontal position.

15. In an ice making machine, a tray; a grid structure received within said tray including relatively movable plates providing a drive plate loosely interlocking a plurality of divider plates for dividing frozen material within the tray into blocks; a support having means for mounting said grid structure and tray for horizontal sliding movement as a unit; means connecting said tray to said grid structure and for pivotal movement of said tray downwardly for separating the grid structure from the tray; latch means on said mounting means for holding said tray in a horizontal position and releasable to effect pivotal downward movement of said tray; power means carried by and connected to said drive plate and being operable to move the divider plates by operation of said drive plate to free the blocks from the grid structure and tray while said grid structure is disposed in the tray and to operate said holding means to release said tray from said grid for pivotal movement of said tray to a downward position to remove the blocks therefrom; means on said support and operative to pivotally move said tray from its downward position to its horizontal position and to effect operation of said holding means to engage and maintain said tray in a grid-receiving horizontal position; and means on said support and normally cooperating with said tray to limit said sliding movement of said tray and grid, and movable to permit disengagement and removal of said grid and tray from said support.

16. In an ice making machine, a tray semi-circular in cross-section; a grid received within said tray including relatively movable plates for dividing frozen material within the tray into blocks; a support; means for mounting said grid for horizontal sliding movement on said support and including means connecting said grid to said tray for conjoint sliding movement and for pivotal movement of said tray downwardly for separating the tray from the grid; a latch on said mounting means and engaging said tray for holding said tray in a horizontal position on said support and releasable to permit pivotal downward movement of said tray; an ice motor connected to said grid and effective to move said plates relative to one another to loosen the blocks while said grid is in the tray; cam means on said motor and tray and effective upon operation of said motor, to operate said latch to release said tray from said grid for causing pivotal movement of said tray to a downward position to remove the blocks therefrom; a lift arm on said support and engageable with the bottom of said tray to pivotally move said tray from its downward position to its horizontal position and then to engage said latch with said tray in a grid-receiving horizontal position; stop means on said support and said tray for limiting horizontal sliding movement of said tray and grid to prevent removal of the tray and grid from the support; and means disabling said stop means to permit removal of said tray and grid from said support.

17. In an ice making machine, a tray having an inclined cam surface at one side thereof; a grid disposed within said tray including relatively movable plates for dividing frozen material within the tray into blocks; a support having means for mounting said grid structure and tray for horizontal sliding movement as a unit on said support; means for pivotal mounting said tray on said support for movement of said tray downwardly for separating the grid from the tray; means on said mounting means for holding said tray in a horizontal position on said support and releasable to effect pivotal downward movement of said tray; power means associated with said grid and tray and effective to move said plates relative to one another from an ice block-forming position to an ice block-loosening position while said grid is disposed in the tray and to operate said holding means to release said tray from said grid for pivotal movement of said tray to a downward position to remove the blocks therefrom; and means on said support and operative to pivotally move said tray during unitary sliding movement of said grid and tray from its downward position to its horizontal position, including means engaging said cam surface on said tray, and to effect operation of said holding means to engage and maintain said tray in a grid-receiving horizontal position.

18. In an ice making machine as defined in claim 17 wherein a stop is provided on said tray at one end thereof and cooperates with said means on said support to prevent removal of said tray and grid from said support during horizontal sliding movement thereof.

19. In an ice making machine as defined in claim 18 wherein the means on said support engaging said cam surface is an elongate member pivotally mounted at one end thereof on said support and is normally spring-actuated to engage said inclined cam surface and stop on said tray and is manually pivotally movable to a position above the tray and the cam surface and stop thereon to permit horizontal sliding movement of the tray and grid structure for removal as a unit from the support.

20. In an ice making machine as defined in claim 17 wherein means, including a spring, are provided for returning the plates to their initial ice block-forming position, and means operative, during actuation of said power means, to disengage said power means from said plates to cause said spring to return said plates to their ice block-forming position with a snap action to separate the blocks from the plates.

21. In an ice making machine, a tray; a grid disposed within said tray and including plates for dividing frozen material within said tray into blocks and relatively movable from an initial ice block-forming position to an ice block-loosening position; power means engaging said plates for moving said plates relative to each other to an ice block-loosening position; means, including a spring, for moving said plates relative to each other to their initial ice block-forming position; and means operative, during actuation of said power means to disengage said power means from said plates to cause said spring to return said plates to their initial ice block-forming position with a snap action to separate the blocks from the plates 22. In an ice making machine, a tray; a grid disposed within said tray and including plates for dividing frozen material within said tray into blocks and relatively movable from an initial ice block-forming position to an ice block-loosening position; an ice motor engaging said plates for moving said plates relative to each other to an ice block-loosening position; means, including a spring, for moving said plates relative to ecah other to their initial block-forming position; and means operative, during actuation of said ice motor to disengage said ice motor from said plates to cause said spring to return said plates to their initial ice block-forming position with a snap action to separate the blocks from the plates.

23. In an ice making machine, a tray; a grid disposed within said tray and including plates for dividing frozen material within said tray into blocks and relatively movable from an initial ice block-forming position to an ice block-loosening position; power means engaging said plates for moving said plates relative to each other to an ice block-loosening position; means, including a spring, for moving said plates relative to each other to their initial ice block-forming position; and cam means operative, during actuation of said power means to disengage said power means from said plates to cause said spring to return said plates to their initial ice block-forming position with a snap action to separate the blocks from the plates.

24. In an ice making machine, a tray; a grid disposed within said tray and including plates for dividing frozen material within said tray into blocks and relatively movable from an initial ice block-forming position to an ice block-loosening position; power means engaging said plates for moving said plates relative to each other to an ice block-loosening position; means, including a spring, for moving said plates relative to each other to their initial ice block-forming position, said power means causing energy to be stored in said spring; and means operative, during actuation of said power means to disengage said power means from said plates to release the energy stored in said spring by said power means to cause said spring to return said plates to their initial ice block-forming position with a snap action to separate the blocks from the plates.

References Cited in the file of this patent
UNITED STATES PATENTS

| | | |
|---|---|---|
| 2,302,044 | Mochel | Nov. 17, 1942 |
| 2,701,653 | Henderson | Feb. 8, 1955 |
| 2,757,519 | Sampson | Aug. 7, 1956 |

Disclaimer 2,962,876.—*Clyde F. Baker* and *Romeo Bougie*, Muskegon Heights, Mich., and *Florence B. Anderson*, Village of Winnetka, Ill. SEMI-AUTOMATIC ICE CUBE MAKER. Patent dated Dec. 6, 1960. Disclaimer filed June 14, 1963, by the assignee, *Borg-Warner Corporation*.

Hereby enters this disclaimer to claims 1 through 24 of said patent.

[*Official Gazette October 8, 1963.*]

Notice of Adverse Decision in Interference

In Interference No. 92,019 involving Patent No. 2,962,876, C. F. Baker, R. Bougie and F. B. Anderson, Semi-automatic ice cube maker, final judgment adverse to the patentees was rendered June 7, 1963, as to claims 1 and 2.

[*Official Gazette February 4, 1964.*]